United States Patent [19]

Ditz et al.

[11] Patent Number: 5,121,748
[45] Date of Patent: Jun. 16, 1992

[54] BIOCOMPATIBLE INFUSED ABSORPTION GLASS CONTAINING FEO

[75] Inventors: Hermann Ditz, Landshut; Hartmut Paschke, Ergolding; Ludwig Gaschler, Mainz, all of Fed. Rep. of Germany

[73] Assignee: Schott Glaswerke, Mainz, Fed. Rep. of Germany

[21] Appl. No.: 699,038

[22] Filed: May 13, 1991

[30] Foreign Application Priority Data

May 12, 1990 [DE] Fed. Rep. of Germany ....... 4015264

[51] Int. Cl.$^5$ ..................... C03C 03/87; C03C 04/08
[52] U.S. Cl. .................... 128/631; 501/66; 501/70
[58] Field of Search ............... 501/70, 66, 27; 128/631

[56] References Cited

U.S. PATENT DOCUMENTS

| | | | |
|---|---|---|---|
| 3,169,217 | 2/1965 | Dalton | 501/70 X |
| 3,858,964 | 1/1975 | Diesslinger et al. | 501/66 X |
| 4,277,285 | 7/1981 | Boudot | 501/74 |
| 4,333,072 | 6/1982 | Beigal | 340/825.54 |
| 4,525,462 | 6/1985 | Behr | 501/71 |
| 5,024,727 | 6/1991 | Campbell et al. | 264/272.11 X |
| 5,077,133 | 12/1991 | Cheng | 501/70 X |

FOREIGN PATENT DOCUMENTS

| | | |
|---|---|---|
| 0013650 | 7/1980 | European Pat. Off. |
| 1265360 | 6/1960 | Fed. Rep. of Germany |
| 2527758 | 12/1983 | France |

OTHER PUBLICATIONS

Volf "Chemical Approach to Glass", 1984, pp. 347–348.
CA 133960j (vol. 92, No. 16, Apr. 1980, p. 323).
CA 175980 (vol. 88, No. 24, Jun. 12, 1978, p. 356).
Texas Instruments Registration and Identification Systems: TIRIS-Radio Frequency Identification System, 7 pp. brochure.
Schott-Ruhrglas GmbH: A Schott Group Company, brochure, 7 pp.
SCHOTTinformation, Apr. 1978 (English), "Switching Without Touching," Dr. Hartmut Paschke, 5 pp.

*Primary Examiner*—Karl Group
*Assistant Examiner*—Lisa M. Schull
*Attorney, Agent, or Firm*—Millen, White & Zelano

[57] ABSTRACT

A biocompatible glass which can be melted using infrared radiation contains, based on oxide, 65–68% by weight of $SiO_2$, 0–3% by weight of $Li_2O$, 12–14% by weight of $Na_2O$, 2.5–4% by weight of $K_2O$, 15–17% by weight of $\Sigma$ alkali metal oxides, 2–3% by weight of $MgO$, 4.2–5.5% by weight of $CaO$, 0–2% by weight of $BaO$, 3–4% by weight of $Al_2O_3$, 0–1.0 by weight of $B_2O_3$ and 2.7–4.1% of $FeO$. The glass, due to its infrared meltability and its physiological accertability, is suitable for the encapsulation of sensitive materials, such as transponders or minitransmitters, which are implanted in a living body, or as ampoule glass for melt-encapsulation of sensitive substances.

5 Claims, No Drawings

BIOCOMPATIBLE INFUSED ABSORPTION GLASS CONTAINING FEO

BACKGROUND OF THE INVENTION

This invention relates to glass compositions especially biocompatible glass useful for encapsulation.

A method for obtaining information from animals or via animals comprises implanting a mini-transmitter of transponder in the animal body. Transponders essentially comprise a transmitter antenna and a memory chip and/or sensor or another component and allow the code or other information stored in the memory chip to be read out at any time via an external receiver. Systems of this type are commercially available as animal information and identification systems. In this way, for example, the animal can be identified and its location, body temperature and other data determined and used for scientific purposes, for example to determine migratory routes or to control automatic feeding systems. The transponders, which are extremely sensitive to chemical attack, are screened from body fluids by encapsulation. Known encapsulation materials are some plastics which are expensive or difficult to machine, and glass. Since the encapsulation may, for example in the labelling of wild animals, have to remain in the body for life, i.e., for up to 30 years, glass is a particularly suitable encapsulation material due to its long-term stability, low price and good processing properties. The encapsulation is carried out by introducing the transponder into a glass tube sealed at one end, and then sealing the other end by melting.

The principal disadvantage of the glasses used hitherto for this purpose is that the melt-sealing can only be carried out relative inconveniently. Due to the sensitivity of the transponder to corrosion, it is necessary not only to encapsulate it hermetically, but also to operate it in the absence of traces of corrosive gases, i.e., in a protective-gas atmosphere or in a vacuum. It is not possible to melt the glass using a flame since the water produced by combustion corrodes the transponder in the long term.

The glasses used hitherto are therefore usually sealed by the heat of resistance-heated elements, in general by coil melting. In coil melting, the heat necessary for the melting is generated by an electrical resistance-heated incandescent wire coil. The heat transfer from the coil to the glass takes place principally by convection. However, this has the disadvantage that the melting takes a relatively long time, which results in the transponder experiencing a relatively large amount of heating during the melt-sealing operation and produces long cycle times, i.e., low output of the melt-sealing machine. In addition, the coil only has an extremely limited life.

So-called reed glasses are also already known and are used to encapsulate reed switches and can be melted by means of infra-red radiation, which can be focused and is also effective in a vacuum. Infra-red melting has the advantage of the focusing which is possible enabling large amount of energy to be concentrated at points, so that the melting only takes a short time and thus the encapsulated components only experience a very small amount of heating. However, these reed glasses are not suitable for encapsulation of implantable transponders since they contain a high proportion of toxic constituents ($B_2O_3$, BaO, PbO, etc.) and are therefore harmful in the long term.

SUMMARY OF THE INVENTION

The object of the invention is to find a glass which is suitable for infra-red melting and in which the proportion of toxic constituents is either zero or is at least kept so low that it is physiologically acceptable.

Upon further study of the specification and appended claims, further objects and advantages of this invention will become apparent to those skilled in the art.

To attain these objects, there is provided a biocompatible glass consisting essentially of, in % by weight on an oxide basis, 65–68 $SiO_2$
0–3 $Li_2O$
12.0–14.0 $Na_2O$
2.5–4.0 $K_2O$
15–17 Σ alkali metal oxide
2–3 MgO
4.2–5.5 CaO
0–2 BaO
3–4 $Al_2O$
0–1.0 $B_2O_3$
2.7–4.1 FeO.

As for the $SiO_2$ content of the glass being between 65% by weight and 68% by weight, a content below 65% by weight causes the chemical resistance to drop and increases the danger of crystallization during the production of tubes. A content above 68% by weight results in a high melting point and viscosity as well as a high energy requirement during melting of the glass.

The function of the alkali metal oxides is to reduce the viscosity and the softening point. However, the alkali metal oxide content must not be too high; otherwise, the chemical resistance of the glass becomes too low. The total alkali metal oxide content should therefore be between 15 and 17% by weight. The preferred alkali metal oxide is $Na_2O$, which is used in amounts of 12.0–14.0% by weight. The glass may furthermore contain from 2.5 to 4% by weight of $K_2O$. At $K_2O$ contents of only 4% by weight or more, its adverse effect on the softening point becomes unacceptably noticeable. Lithium oxide may also be present in the glass in amounts of up to 3% by weight. Compared with $Na_2O$ and $K_2O$, $Li_2O$ has a greater viscosity-reducing effect, but an amount of 3% by weight should not be exceeded, since otherwise the tendency towards crystallization becomes excessive and the chemical resistance becomes poor. In most cases, however, the high price of $Li_2O$ means that none is added to the glass.

The alkaline earth metal oxides used are, in particular, CaO in amounts of 4.2–5.5% by weight and MgO in amounts of 2–3% by weight. The purpose of their addition is to improve the chemical stability of the glass. If the contents are below the stated ranges, the chemical stability drops, while, by contrast, exceeding the ranges causes the softening point to increase, which results in an increase in the amount of heating required by the components to be melt-encapsulated. Barium ions are toxic and the BaO content should therefore be as low as possible and below 2% by weight. For prophylactic reasons alone, it would be desirable to omit BaO completely. Nevertheless, the addition of BaO may sometimes by appropriate since it can reduce the viscosity of the glass and thus provide thermal protection of the materials to be melt-encapsulated; BaO concentrations of 2% by weight or less no longer cause toxic reactions.

Aluminum oxide is present in amounts of between 3 and 4% by weight and is used to improve the chemical stability of the glass. If the content is above this range, however, the melting point and the viscosity increase considerably, so that the materials to be melt-encapsulated run the risk of thermal damage. Particularly favorable properties, both with respect to chemical stability and melting point, are achieved within the stated range.

$B_2O_3$ is another glass constituents which can liberate toxic ions. Its maximum content in the glass is 1% by weight. $B_2O_3$ allows the chemical resistance of the glass to be improved, but its content should be kept as low as possible.

The content of iron oxide (FeO) enables the glass to be melted by means of infra-red radiation. Ferrous oxide should be present in such an amount that the infra-red radiation is substantially absorbed in the melting operation by the glass to be melted and absorption is as uniform as possible over the thickness of the glass. If the concentration of iron(II) ions is too low, absorption is too low, resulting in relatively long melting times. If the concentration is too high, all the absorption takes place close to the surface. The underlying layers must then be warmed by conduction from the layers close to the surface, likewise resulting in reactively long melting times. However, relatively long melting times cause the material to be melt-encapsulated to experience relatively great heating due to the condition of the glass. Good results are achieved for the customary wall thickness of transponder tubes or ampoules of from 0.1 to 1 mm if the transmission of the glass at a thickness of 1 mm and a wavelength of $\lambda = 1060$ nm is between 2% and 20%. This is the case at an FeO concentration of from 2.7 to 4.1% by weight. The thinner the wall thickness of the glass to be melted, the greater the target absorption and consequently the higher the FeO content necessary. If the iron is added in the form of $Fe_2O_3$ in the melting stage during glass making, a suitable melting program must be used to ensure that a sufficient amount of the Fe(III) is reduced to Fe(II) in order to obtain the stated FeO contents in the glass. However, the total iron content, calculated as $Fe_2O_3$, should not exceed 7% by weight due to the tendency toward separation.

The extremely reduced content to toxic constituents makes the novel glass physiologically acceptable and imparts excellent tissue compatibility. The glass has good stability, so that it can easily be processed on tube-drawing machines to give tubes. Its good infra-red melting properties make it highly suitable for gentle and rapid encapsulation of transponders and other materials to be implanted and as an ampoule material for packaging sensitive materials.

Without further elaboration, it is believed that one skilled in the art can, using the preceding description, utilize the present invention to its fullest extent. The following preferred specific embodiments are, therefore, to be construed as merely illustrative, and not limitative of the reminder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding application Federal Republic of Germany P 40 15 264.2, filed May 12, 1990, are hereby incorporated by reference.

EXAMPLES

The glasses listed in Table 1 (composition given in % by weight, based on oxides) were produced by melting conventional glass starting materials. Also given is the processing temperature Va, i.e., the temperature at which the glass has a viscosity of $10^4$ dPas. In order to demonstrate the reduced heating experienced by encapsulated materials, a transponder tube sealed at one end (at the base) and having an outer diameter of 2.1 mm and a wall thickness of 0.25 mm was produced from glass No. 1. For comparison, a glass tube of the same dimensions employed conventionally for melting-encapsulation for transponders was used. Before sealing at one end, a thermocouple was inserted into the tubes and positioned 10 mm below the planned melt-sealing point. The connecting wires were passed through the base to the outside. The tubes were then positioned, 20 mm above the base, in the point of focus of a focused IR light beam (infra-red lamp power 110 W) or in the center of an incandescent coil (coil diameter 7 mm, power 110 W). The time required for melt-sealing and the maximum temperature measured at the thermocouple are shown in Table 2.

TABLE 1

|  | 1 | 2 | 3 |
|---|---|---|---|
| $SiO_2$ | 65.2 | 66.5 | 67.36 |
| $Li_2O$ | — | — | — |
| $Na_2O$ | 12.48 | 13.0 | 12.48 |
| $K_2O$ | 3.23 | 3.0 | 3.23 |
| $\Sigma$ alkali metal oxide | 15.71 | 16.0 | 15.71 |
| MgO | 3.24 | 2.5 | 2.65 |
| CaO | 5.05 | 4.8 | 4.68 |
| BaO | 2.00 | 1.9 | 1.00 |
| $Al_2O_3$ | 4.00 | 3.6 | 4.00 |
| $B_2O_3$ | 1.00 | 0.9 | 0.5 |
| FeO | 3.80 | 3.4 | 4.10 |
| Va (°C.) | 990 | 908 | 1010 |

TABLE 2

|  | Melting time | T. max. | Note |
|---|---|---|---|
| IR radiation |  |  |  |
| Glass No. 1 | 5 sec. | 90° C. |  |
| Comparison glass | — | 150° C. | no melting even after 60 sec. |
| Coil heating |  |  |  |
| Glass No. 1 | 10 sec. | 85° C. |  |
| Comparison glass | 30 sec. | 150° C. |  |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

In the following claims, the term "encapsulate" refers to a glass-encapsulated substance or device.

What is claimed is:

1. Biocompatible glass consisting essentially of, in % by weight on an oxide basis,
   65-68 $SiO_2$
   0-3 $Li_2O$ 12.0–14.0 Nm$_2$O
2.5–4.0 K$_2$O
15–17 Σ alkali metal oxide
2–3 MgO
4.2–5.5 CaO
0–2 BaO
3–4 Al$_2$O$_3$
0–1.0 B$_2$O$_3$
2.7–4.1 FeO.

2. Biocompatible glass according to claim 1 in the form of tubing having a wall thickness of 0.14–1 mm.

3. An ampoule or encapsulate made of tubing according to claim 2.

4. An encapsulate according to claim 3 containing a transponder.

5. A sealed ampoule or encapsulated according to claim 3, wherein the ampoule or encapsulate is sealed by applying infrared radiation thereto.

* * * * *